United States Patent [19]
Legris

[11] 4,379,367
[45] Apr. 12, 1983

[54] ELECTRICALLY CONTROLLED LEVEL

[76] Inventor: Marcel Legris, Place de la Parette, Air Bel Bt 48, 13011 Marseille, France

[21] Appl. No.: 221,637

[22] Filed: Dec. 31, 1980

[51] Int. Cl.³ .......................... G01C 5/04; G01C 9/22
[52] U.S. Cl. ................................ 33/367; 73/432 HA; 340/612
[58] Field of Search ............ 73/432 HA, 723; 33/367

[56] References Cited

U.S. PATENT DOCUMENTS

| | | | |
|---|---|---|---|
| 1,600,121 | 9/1926 | Mazade | 33/367 X |
| 2,777,028 | 1/1957 | Kendall et al. | 200/83 J |
| 3,217,309 | 11/1965 | Parker | 200/83 J X |
| 3,779,084 | 12/1973 | Nilsson | 73/432 HA |
| 3,786,472 | 1/1974 | Scopacasa | 33/366 |
| 3,815,423 | 6/1974 | Gearhart | 73/432 HA |
| 4,026,156 | 5/1977 | Bowditch | 33/367 X |
| 4,195,531 | 4/1980 | Okamura | 73/723 |

FOREIGN PATENT DOCUMENTS

| | | | |
|---|---|---|---|
| 550572 | 9/1956 | Belgium | 73/301 |
| 2607513 | 5/1977 | Fed. Rep. of Germany | 73/301 |
| 2810687 | 9/1979 | Fed. Rep. of Germany | 73/432 HA |

*Primary Examiner*—Daniel M. Yasich
*Attorney, Agent, or Firm*—Young & Thompson

[57] ABSTRACT

Apparatus for comparing the level of two spaced points, to find which is higher or lower, and possibly also for determining the magnitude of the difference in level of the points. The apparatus comprises two chambers that communicate with each other through a flexible conduit. The conduit and the lower portion of each chamber is filled with liquid, preferably mercury, whose level in each chamber varies as the elevations of the chambers relative to each other. An electric circuit interconnects the chambers; and the circuit is opened or closed upon variation in the relative levels of the chambers; or the amount of current flowing in the circuit is progressively changed with changes in the relative elevation of the chambers. Various embodiments of circuit for achieving this are disclosed, including make-or-break contacts, a variable capacitor, a variable resistance slide wire, and a variable resistance deformable strain gauge. A solid member in each chamber moves with the liquid in the chamber to actuate the electric circuit.

2 Claims, 7 Drawing Figures

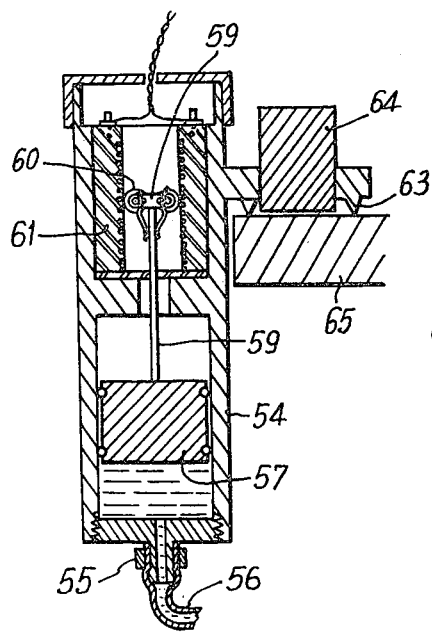
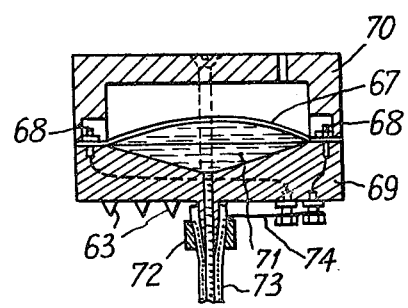
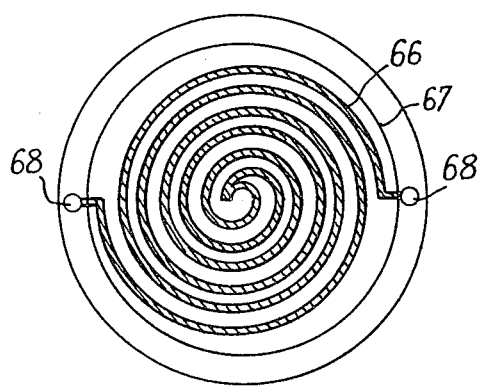
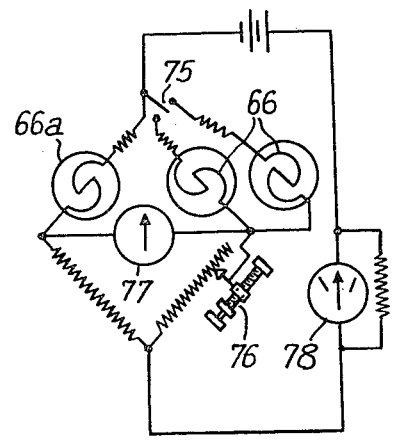

ELECTRICALLY CONTROLLED LEVEL

The present invention relates to instruments called levels, which permit controlling the horizontality of a line defined by two spaced points, and also to measure the difference in the heights of these two points and to control manually or remotely apparatus for correcting these heights.

Instruments called mason's levels most commonly in use are comprised by two liquid level chambers connected by a tube, the coincidence of the liquid level with reference marks provided in the two chambers indicating the horizontality of the two reference marks, a graduated scale provided on the two level chambers permitting the measurement of the differences of height. Some of these instruments include electrical apparatus for determining the horizontality or the difference of the levels, comprising a liquid level detection contact in each level chamber.

A device of this type has been disclosed in German published application No. 26 07513. However, in practice, such instruments are difficult to use and require for their use the presence of two operators. Other difficulties and disadvantages result from the very nature of these devices, which are not sealed. These devices, when they are electrical in nature, permit only the detection of the coincidence of the level of the surface of the liquid which must be conductive, with the tip of a contact electrode mounted in the associated chamber. Any variation of apparent volume of the tube or of the liquid because of mechanical failure or thermal expansion, no matter how small, throws the instrument off. Moreover, it is very difficult to prevent movements of the liquid which, with deformations of the meniscus of the liquid due to surface tension along the walls of the chambers or along the electrodes, renders difficult and chancy the reading of the level. As a result, these instruments are of low precision and are slow particularly when determining a difference of level which requires a regulation of the position of the contact.

The present invention accordingly has for its object to overcome these difficulties and to provide improvements in instruments known as levels operating according to the principle recited above, embodying communicating tubes.

Another object of the present invention is to provide an instrument in the nature of a level of the type comprised by at least two constructions each bearing a level reference mark permitting their positioning with respect to the associated location whose level is to be compared or measured, each having a reservoir filled with a liquid, these reservoirs being in communication by means transmitting hydrostatic pressure such as a tube of small diameter. Each reservoir is substantially hermetically sealed in one of its horizontal sections by a movable element limiting the upper horizontal surface of the volume of liquid, at least one of these movable elements cooperating with a detection or recording device integral with the construction which controls, as a function of this detection, display means. Preferably, a detection device cooperates with each of the movable elements and the detected values are compared, the control of the display means being effectuated as a function of this comparison.

The movable elements may be constituted each by a flexible membrane fixed about its periphery to the wall of the reservoir, these membranes of all the reservoirs, which as a practical matter will usually be two reservoirs, having the same characteristics of elasticity, the relative levels corresponding to the planarity, the concavity or convexity of these membranes. They may also be constituted each by a movable piston in the reservoir which provides the cylinder, but, in such case, the frictional forces may give rise to error. They may also be constituted advantageously by inflatable chambers.

Thus, with the present invention, the factors giving rise to imprecision in known levels are avoided, the detection device of the present invention coacting no longer with a liquid whose surface is subjected to the phenomena of surface tension but with a movable solid member.

The level, according to the present invention, may be constructed in two distinctly different ways, as follows:

According to a first embodiment, the displacement of at least one movable member is limited by a detector which is of the strain gauge type, the two movable elements occupying a substantially fixed position in the housings and the difference of level being manifested by a difference in the value of the force applied to the receiver. The receiver may be of any type known for measuring of force, provided that it has very great sensitivity, the strain being created by the differential height of the hydrostatic heads and the level state being arrived at when this value is zero. Such a detector or receiver may be constituted for example by an elastically deformable element, a strain gauge, a piezoelectric detector, etc.

According to a second embodiment, the displacement of the movable elements is totally free, these elements operating according to the principle of conduits communicating in the same horizontal plane and the difference of the levels of these points being reflected by different positions of the movable elements with respect to their housing. The detector can be of any desired known type for the detection of the distance of an element relative to a fixed point and may be constituted for example by a simple graduated scale as found in free liquid surface levels already known, a potentiometric detector, a transmitter of variation of reluctance of the variable transformer type, a detector of variation of electrical capacitance, etc.

In the two embodiments, if one desires to detect only horizontality and perhaps the sign of the difference in level but not its value, the collectors may comprise simple electrical contacts. In this case however, and given that the device uses the difference in condition of the collectors (contacts opened or closed) and not the comparison of values measured by the two collectors, it is necessary to provide a zero correction device and, according to a preferred embodiment, this latter is constituted by means permitting variation of the apparent volume in which the transmission liquid is enclosed.

Referring to a first embodiment, the liquid should be of high density and is comprised as a practical matter by mercury. The two reservoirs should have relatively large cross sections so that the hydrostatic pressure of the differential column of liquid creates on the collector, by virtue of that section, a force whose value permits a precise detection.

According to a second embodiment, by contrast, in which there is equilibrium of the surfaces of the two reservoirs, the density of the liquid and its physical characteristics such as viscosity play only a secondary roll to permit achieving more rapidly and with minimum oscillation the state of equilibrium.

The transmission means of the hydrostatic pressure between the two reservoirs may be in known manner constituted by a tube of any desired section filled with the same liquid as the reservoirs. Preferably and in known manner, when the liquid is mercury the connection tube will be of small cross section. In known levels and according to the second embodiment described above, the reservoirs should have a substantially constant cross section over the entire range of utilization which corresponds to the maximum difference in height to be measured so as to obtain corresponding variations of the same order and reverse direction in the two reservoirs whose cross-sectional area may be reduced to the minimum compatible with the operation of the collector.

Other objects, features and advantages of the present invention will become apparent from a consideration of the following description, taken in connection with the accompanying drawings, in which:

FIG. 4 is a cross-sectional view of a variable resistance collector according to a third embodiment;

FIG. 5 is a cross-sectional view of a strain gauge collector according to a fourth embodiment;

FIG. 6 is a plan view of the strain gauge of FIG. 5; and

FIG. 7 is a schematic circuit diagram of a level as in FIGS. 5 and 6.

Figure 1:
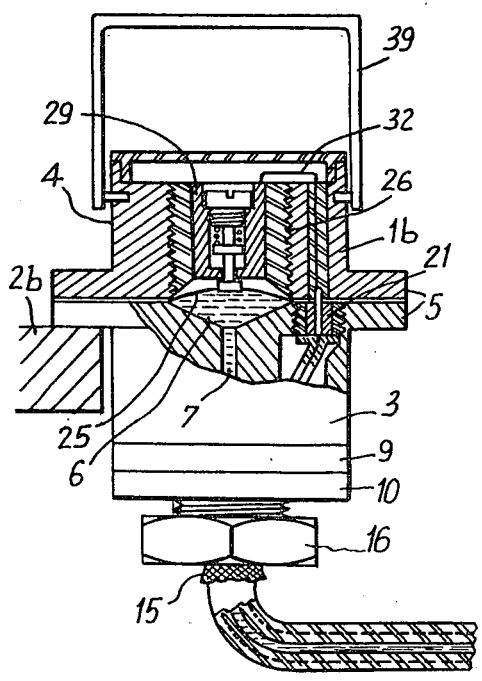
FIG. 1 is a cross-sectional view of the two collecting level chambers with electrical contacts, according to the invention.

The level of FIG. 1 comprises a principal or master chamber 1a and a secondary chamber 1b, the level being used to bring the level of the upper surface of an element 2b to the level of the upper surface of a reference element 2a. Each chamber comprises a lower semi-chamber 3 and an upper semi-chamber 4. The semi-chambers are connected by peripheral flanges 5, the lower surface of the lower flange comprising the bearing surface of the level which is brought to bear against the upper surface of the corresponding element 2a, 2b.

At the center of the upper face of lower semi-chamber 3 is provided a conical cavity 6 at the apex of which there is a capillary channel 7 which terminates centrally of a connector 8 which passes through an insulating ring 9 and a conductive clamping ring 10, ring 10 being secured to semi-body 3 by screws 11 which screw-threadedly engage with threaded insulating plugs 12 so as to insulate ring 10 from semi-body 3. On connector 8 is engaged the end of a flexible tube 13 comprising a central channel of very small internal diameter and a conductive wire armature 15 shown in phantom lines. At right angles to connectors 8, armature 15 is stripped and bent outwardly so as to come into contact with a connecting nut 16 which screws into ring 10 thereby compressing, via an elastomeric joint 18, the central portion of the end of tube 13 down on the connector 8. Ring 10 is in contact, via a pin 19 extending through insulating ring 9, with an insulated conducting socket 20 electrically connected to an insulated socket 21 on the upper surface of semi-body 3. The two sockets 21 of the two semi-bodies 3 are thus electrically connected.

The semi-body 3 of the master chamber 1a comprises also a cylindrical chamber 22 in communication with channel 7. A piston 23 slides in a sealed manner in this chamber by screwing of its screw-threaded head 24 in the threads at the ends of the chamber.

A flexible diaphragm 25 comprising at its center a conductive plug 26 is gripped between each of the two flanges 5 so as to close the conical chamber 6 of the lower semi-body 3. As these chambers 6 and the channels 7 and tube 13 are filled with mercury, the two plugs 26 are electrically connected.

At the center of each upper semi-body 4 is provided a threaded hole 27 in which is screwed an insulating sleeve 28 comprising at its center a conductive recessed socket 29 with an axial bore in which a contact piston 30 moves against the action of a small compression spring. A screw-threaded plug 31 regulates the spring force. The contact piston 30 coacts with plug 26 when, as shown in the case of the left chamber 1b, which is lower than 1a, the membrane 25 is deformed upwardly like a cupola. The conductive socket 29 of secondary chamber 1b is connected by an insulated wire 32 to a pin that seats in socket 21.

In the upper body 4 of master chamber 1a, an insulated conductor 32a connects socket 21 at one of its terminals to a lamp 33b secured to the cover 34 of a casing 35 atop body 4. The conductive socket 29 of the principal chamber is directly connected at one of its ends to a second lamp 33a. The second terminal of the two lamps is connected by a push button contact 36 at one of its terminals to a battery 37 whose other terminal is connected by wire 38 to the mercury located in the chamber 22.

A handle 39 facilitates carrying of the chamber 1b.

Figure 2:
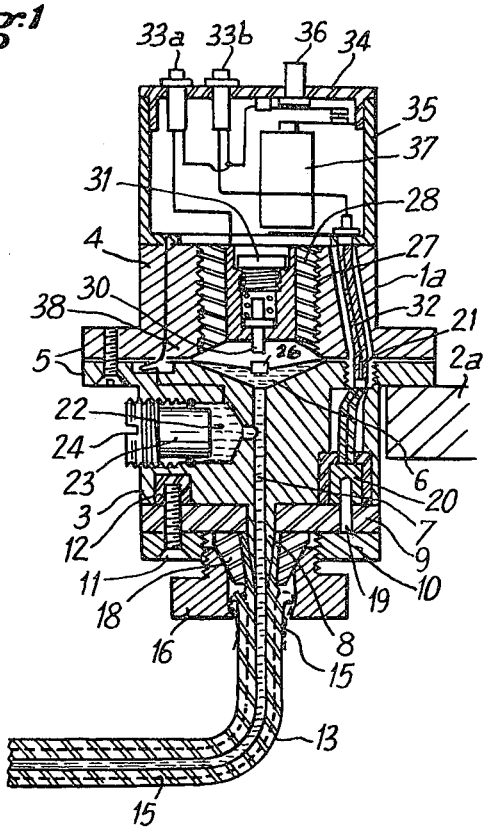
FIG. 2 is an electrical circuit diagram of the device of FIG. 1.
Figure 2:
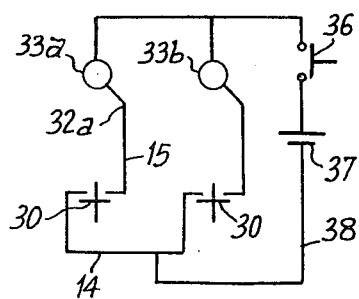

In FIG. 2, the same reference numerals indicate the same elements in the electrical circuit. When the push button contact 36 is closed, the circuit of the lamp 33a is closed by the wire 38, the mercury filling the chamber 22 and the cavity 6, the conductive plug 26, the contact 30 and the conductive ring 29, if the plug 36 is, by virtue of the deformation of the membrane 25 of chamber 1a, in contact with contact 30 of this chamber. The circuit of the lamp 33b closes via the wire 38, the mercury filling the chamber 22, the tube 13 and the chamber 6 of the chamber 1b, the conductive plug 26, the contact 30, the conductive ring 25, the conductor 32, the armature wire 15 and the conductor 32a, if the corresponding plug 26 is, by virtue of the deformation of the membrane 25 of the chamber 1b, in contact with the contact 30 of this chamber. As a result, the lamp 33 lights and the lamp 33b is extinguished, meaning that the chamber 1a is bearing on a surface 2a whose level is lower than that of the surface 2b, and conversely.

The two lamps being lighted or extinguished simultaneously means that the chambers are substantially level and, to refine the measurement, one can adjust the screw-threaded plug 24 so as, if both are lighted, to increase the volume of chamber 22, or, if they are both extinguished, to decrease this volume. The lamp 33 extinguishes first or remains extinguished corresponding to a higher level, equality of level being achieved when the two lamps light and extinguish simultaneously upon a very small adjustment of threaded plug 24.

Figure 3:
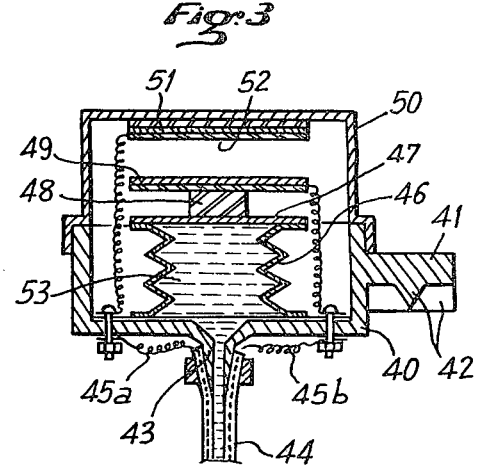
FIG. 3 is a cross-sectional view of a capacitative collector with an inflatable chamber according to a second embodiment.

In the embodiment of FIG. 3, the collector is of the capacitative type. The lower semi-body 40 in the form of a cylindrical casing carries laterally a bracket 41 under which are provided two perpendicular ribs 42 providing knife edges that define the pressure plane on the surface whose level is to be compared. At the center of the base of the semi-body is provided a connecting ferrule 43 with a flexible tube 44 having a narrower internal channel and also having two insulated wires 45a and 45b extending therealong. On the base is mounted in a sealed fashion an inflatable bellows 46 closed by a plate 47, which plate carries on its upper surface insulators 48 mounting another plate 49 which is an armature of a condenser. On the inner side of the base of cover 50 is mounted a second condenser plate or armature 51 covered with a dielectric layer 52. Plates 49 and 50 are electrically connected to the conductors 45a and 45b. The liquid 58 of the device fills the inflatable bellows which comprises the level chamber of this embodiment and also the connecting tube 44. The value of the capacitance formed by plates 49 and 50 decreases when the level of the bearing surface of the chamber in question is lower than the level of that to which it is connected, and vice versa, equality being achieved when they are at the same level. It suffices to connect the conductors 45a and 45b in a measurement circuit of the capacitance to be able to compare the levels of the two chambers interconnected by tube 44. The liquid 53 may be any desired liquid; but as in the preceding embodiments, it is preferred to use a liquid of high density so as to achieve a large difference in hydrostatic pressure for a relatively small difference in level.

FIG. 4 shows a collector analogous to that of FIG. 3 but with a collector comprised by a variable resistance. Body 54 of the collector is a cylinder whose lower part, connected by a coupling ferrule 55 to a flexible tube 56, constitutes the cylinder of a fluidtight piston 57. This piston carries by a rod 58 a contact slider 59 having two rollers 60 opposed to each other which bear elastically against two slender conductors helically wound about the internal face of a cartridge comprising a variable resistor 31. In this embodiment, the more the piston 57 rises the more the resistance in circuit 62 decreases. The bearing surface of the chamber is defined by three points 63, a magnet 64 permitting securement on a magnetic metal body 65 whose level is to be measured or compared.

The embodiment of FIGS. 5 and 6 is based on the variation of resistance of a strain gauge constituted in known manner by a conductive film 66 deposited on a flexible membrane 67. The resistance between the two terminals 68 increases when the membrane 67 deforms under action of pressure. As shown in FIG. 5, the membrane 67 is mounted on a capsule constituted by lower and upper semi-bodies 69 and 70, respectively, connected by screw-threading to grip between them the member 67. The lower semi-body 69 comprises in its central portion a conical recess 71 connected by a slender channel 62 to a flexible tube 73 carrying also the double armature wire, the two wires 74 being connected to the terminals 68.

The comparison of the values of the two resistances may be effected in known manner with a bridge such as that illustrated in FIG. 7. In the case where the level comprises more than two cells, the contactor 75 is used to select the one whose level will be compared with the level of the base cell 66a. The two cells being set at the same level for calibration, one balances the bridge with a variable resistance 76 so as to obtain on the microvolt meter 77 a zero potential difference. One adjusts the pressure of the liquid to obtain on the microammeter 78 a current corresponding to the maximum sensitive zone of the strain gauge collectors. If the strain gauges are electrically identical, the voltmeter 77 should remain at zero during this adjustment. One then emplaces the cells and lets them bear by their points 63 on the surfaces whose level is to be compared. If the surfaces are at different levels, the resistances 66 and 66a are not equal and the microvolt meter 77 deviates in the direction and with a value corresponding to the difference in levels.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for comparing the level of two spaced points, comprising a pair of vertically movable chambers, flexible conduit means of reduced section interconnecting the two chambers, reference means on each chamber adapted to come into contact with a said point whose level is to be compared, thereby to predetermine the position of said chamber relative to said point, said chambers and conduit containing mercury which is free to flow from chamber to chamber through said conduit, a flexible elastic diaphragm fixed about its periphery to the walls of each chamber, said diaphragm enclosing the mercury in the part of said chamber in which opens the flexible conduit along a substantially horizontal section of said chamber, said flexible elastic diaphragms flexing under the difference in the hydrostatic pressures resulting from the difference in the levels of the chambers relative to each other, electric means responsive to the direction of flexing of said diaphragms to determine which of said points with which said chambers are in contact by said reference means is at the higher level, and means permitting variation of the volume enclosed by said flexible diaphragms, said chambers and said flexible conduit means.

2. Apparatus as claimed in claim 1 in which said electric means comprise an electric contact on each said diaphragm, an electric circuit interconnecting said contacts on said diaphragms, said contact contacting or retreating from a second said contact in each said chamber depending on the direction of flexing of the diaphragm of said chamber, to close or open said circuit, respectively, and means indicating said closed or opened state of each circuit through each said second contact.

* * * * *